US010554124B1

(12) United States Patent
Mangudi et al.

(10) Patent No.: US 10,554,124 B1
(45) Date of Patent: Feb. 4, 2020

(54) MULTI-LEVEL BUCK CONVERTER WITH CURRENT LIMIT AND 50% DUTY CYCLE CONTROL

(71) Applicant: DIALOG SEMICONDUCTOR (UK) LIMITED, London (GB)

(72) Inventors: Aravind Mangudi, Chandler, AZ (US); William McKillop, Chandler, AZ (US); Mark Mercer, Chandler, AZ (US); Muhammad Nabeel Rahman, Chandler, AZ (US); Kevin Dowdy, Chandler, AZ (US)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 16/149,024

(22) Filed: Oct. 1, 2018

(51) Int. Cl.
*H02M 3/158* (2006.01)
*H02M 3/07* (2006.01)
*H02M 1/08* (2006.01)
*H02M 1/00* (2006.01)

(52) U.S. Cl.
CPC ............... *H02M 3/07* (2013.01); *H02M 1/08* (2013.01); *H02M 2001/0025* (2013.01)

(58) Field of Classification Search
CPC .. H02M 3/158; H02M 3/1584; H02M 3/1588; H02M 2003/1586
See application file for complete search history.

(56) References Cited

U.S. PATENT DOCUMENTS 7,859,239 B2 * 12/2010 Yamada ............. H02M 3/1588 323/282
9,866,113 B1 * 1/2018 Assaad ................... H02M 3/07
10,404,175 B2 * 9/2019 Chakraborty ......... H02M 1/088
2007/0252567 A1 * 11/2007 Dearn .................. H02M 3/156 323/282
2009/0128112 A1 * 5/2009 Xu ......................... H02M 1/32 323/282
2014/0232364 A1 * 8/2014 Thomas ............... H02M 7/483 323/271
2016/0254746 A1 * 9/2016 Lerdworatawee .... H02M 3/158 323/271
2016/0315539 A1 * 10/2016 Lee ...................... H02M 3/158
2018/0097447 A1 * 4/2018 Iorio .................... H03K 17/163

* cited by examiner

*Primary Examiner* — Gary L Laxton
(74) *Attorney, Agent, or Firm* — Haynes and Boone, LLP

(57) ABSTRACT

A multi-level buck converter is provided with multiple control loops to regulate the output voltage in the presence of over-current conditions and in the vicinity of a 50% duty cycle.

17 Claims, 12 Drawing Sheets

MULTI-LEVEL BUCK CONVERTER WITH CURRENT LIMIT AND 50% DUTY CYCLE CONTROL

TECHNICAL FIELD

The present invention relates to a multi-level buck converter, and more particularly to a multi-level buck converter with current limit and 50% duty cycle control.

BACKGROUND

As compared to a conventional buck converter, a multi-level buck converter such as a three-level buck converter has several advantages such as increased efficiency at high load states. In addition, the additional switches in multi-level buck converters in combination with the flying capacitor voltage being one-half the input voltage lower the switching stresses as compared to conventional buck converters. Moreover, the ripple is reduced as the four switches in three-level buck converters produce twice the ripple frequency as compared to the ripple frequency at the same switching speed for a conventional (single-phase) buck converter such that the switching frequency is effectively doubled for a three-level buck converter. This increase in output ripple frequency advantageously enables a multi-level buck converter to use a smaller inductor as compared to a conventional buck converter.

As compared to a conventional buck converter, the root-mean-square (RMS) switching node voltage $V_{SW}$ at the input node to the inductor is reduced by 50%. In particular, it can be shown that $V_{SW}$ will switch between the input voltage $V_{IN}$ and one-half of the input voltage if the output voltage is greater than one-half of the input voltage. Conversely, $V_{SW}$ will switch between $V_{IN}/2$ and ground if $V_{IN}/2$ is greater than $V_{OUT}$. This reduction in the switch node voltage swing also reduces the switching voltage stresses on the switching transistors. Given the reduced voltage stress, multi-level buck converters also offer reduced conduction losses for its switch transistors.

But these advantages come at the cost of increased regulation complexity with regard to controlling the multi-level switches. In general, there are four switching states for a four-switch multi-level buck converter as shown in FIG. 1. In each switching state, only two switch transistors are on from a set of four switch transistors: a switch transistor A, a switch transistor B, a switch transistor C, and a switch transistor D. In a switching state D1, switch transistors A and C are on such that the flying capacitor voltage $V_{CF}$ is charged by the input voltage and drives the switch node voltage $V_{SW}$ at the input of the inductor. The resulting inductor current $I_{SW}$ charges an output capacitor with the output voltage $V_{OUT}$. In a switching state DV, switch transistors C and D are on such that the inductor freewheels and discharges into the output capacitor. The flying capacitor floats during switching state DV. In a switching state D2, switch transistors D and B are on such that the flying capacitor discharges into the switch node. Finally, switch transistors A and B are on in a switching state DP such that the switch node is charged to the input voltage $V_{IN}$. The flying capacitor floats during switching state DP.

Despite this increased control complexity, prior-art multi-level buck converters have typically employed conventional buck converter control techniques such as valley-mode or peak-mode (peak-current) control. But the transition between valley-mode and peak-mode control in a multi-level buck converter creates a number of control stability issues that are not present in standard buck converters. In particular, note that a transition from peak to valley-mode control is typically unnecessary in a conventional buck converter over a wide range of operating conditions. But conventional multi-level buck converters that use current-mode control to maintain an amps-seconds balance on the flying capacitor transition between valley-mode and peak-current control when the duty cycle ranges from less than 50% to greater than 50% (the duty cycle being defined as the ratio of the output voltage to the input voltage). It is thus conventional to limit multi-level buck converter control to just one of the valley-mode and peak-current control modes. But such a control limitation in turn limits the duty cycle range.

A multi-level buck converter that seamlessly controls the output voltage regardless of the duty cycle is disclosed in commonly-assigned U.S. Pat. No. 9,929,653 (the '653 patent). The multi-level buck converter of the '653 patent selects between the D1, D2, DV, and DP switching depending upon the relationship between an error signal and a dual-ramp signal formed by two ramp signals that are 180 degrees out of phase with each other. If the error signal equals the mid-point of the dual-ramp signal, the switching states D1 and D2 alternate with a 50% duty cycle. But as the error signal rises above the midpoint for the dual-ramp signal, the alternating D1 and D2 switching states are separated by the DP switching state. In particular, the duty cycle for the DP state increases from zero as the error signal increases from the midpoint for the dual-ramp signal. Conversely, the DV states separates the alternating D1 and D2 switching states as the error signal falls below the midpoint such that the duty cycle for the DV state increases from zero as the error signal decreases from the midpoint for the dual-ramp signal.

The resulting control solves the limitation of prior art multi-level buck converters being dedicated to a particular duty cycle range. However, note that there is a minimum pulse width for the DV and DP switching states. But as the error signal transitions to be just slightly greater or less than the midpoint for the dual-ramp signals, the desired pulse width for the DV or DP switching states may be less than the minimum pulse width (which may also be designated as a minimum pulse duration). The control algorithm may call for a pulse width for the DV or DP switching states that is some fraction of the minimum pulse width as the error signal transitions from being equaling the midpoint for the dual-ramp signal. But this desired fractional pulse width cannot be achieved. Although the control algorithm commands for a DV or DP pulse width of some fractional amount, what can be achieved is instead the minimum pulse width. This difference between the desired duration for the DV and DP switching states and the minimum duration that can be implemented results in undesirable magnetization or demagnetization of the inductor current. Accordingly, there is a need in the art for an improved multi-level buck converter employing dual-ramp signal control having a minimum pulse width for the switching states that achieves the desired magnetization or demagnetization of the inductor current as the error signal transitions from equaling the midpoint for the dual-ramp signal.

The multi-level buck converter disclosed in the '653 patent also regulates the flying capacitor voltage by adjusting the D1 and D2 pulse widths. But this regulation of the flying capacitor voltage raises another issue for dual-ramp control architectures which is that the current though the multi-level transistor switches cannot exceed a current limit to prevent damage to the multi-level transistor switches and also to increase safety of the device. Thus, the control algorithm may command for a certain pulse width or duration for the D1 and D2 switching states that cannot be achieved due to the current limit being reached. As a result, the flying capacitor voltage may fall out of regulation due to the inability to achieve the desired D1 and D2 pulse widths. Accordingly, there is a need in the art for an improved multi-level buck converter employing dual-ramp signal control in the presence of over-current conditions.

SUMMARY

To address the control problems that occur for dual-ramp control as the output voltage approaches a 50% duty cycle operation, a multi-level buck converter is disclosed that responds to a minimum pulse width DP switching state by forcing a minimum pulse width DV switching state and also responds to a minimum pulse width DV switching state by forcing a minimum pulse width DP switching state. The forced minimum pulse width DP and DV switching states prevent the under and over magnetization of the inductor as the multi-level buck converter operates as the output voltage approaches a 50% duty cycle.

To address the control problems that occur for dual-ramp regulation of the flying capacitor voltage in the presence of an over-current condition for the inductor, a multi-level buck converter is disclosed that clamps the error signal for an error amplifier that produces the error signal responsive to a difference between the output voltage and a reference voltage. The clamped error signal prevents the magnetizing switching state for the multi-level buck converter from being prematurely terminated due to the over-current limit being reached. The flying capacitor voltage is thus maintained in regulation despite the occurrence of the over-current condition.

These and additional advantageous features for the disclosed multi-level buck converters may be better appreciated through consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A multi-level buck converter is provided with dual-ramp control that seamlessly regulates the output voltage despite the use of minimum DP and DV pulse widths at a 50% duty cycle. In addition, a multi-level buck converter is provided with dual-ramp control that maintains the flying capacitor voltage regulation in the presence of over-current limits. The control adaptation for the minimum DP and DV pulse widths will be discussed first followed by a discussion of the flying capacitor voltage regulation.

Minimum DP and DV Pulse Widths

Figure 2:
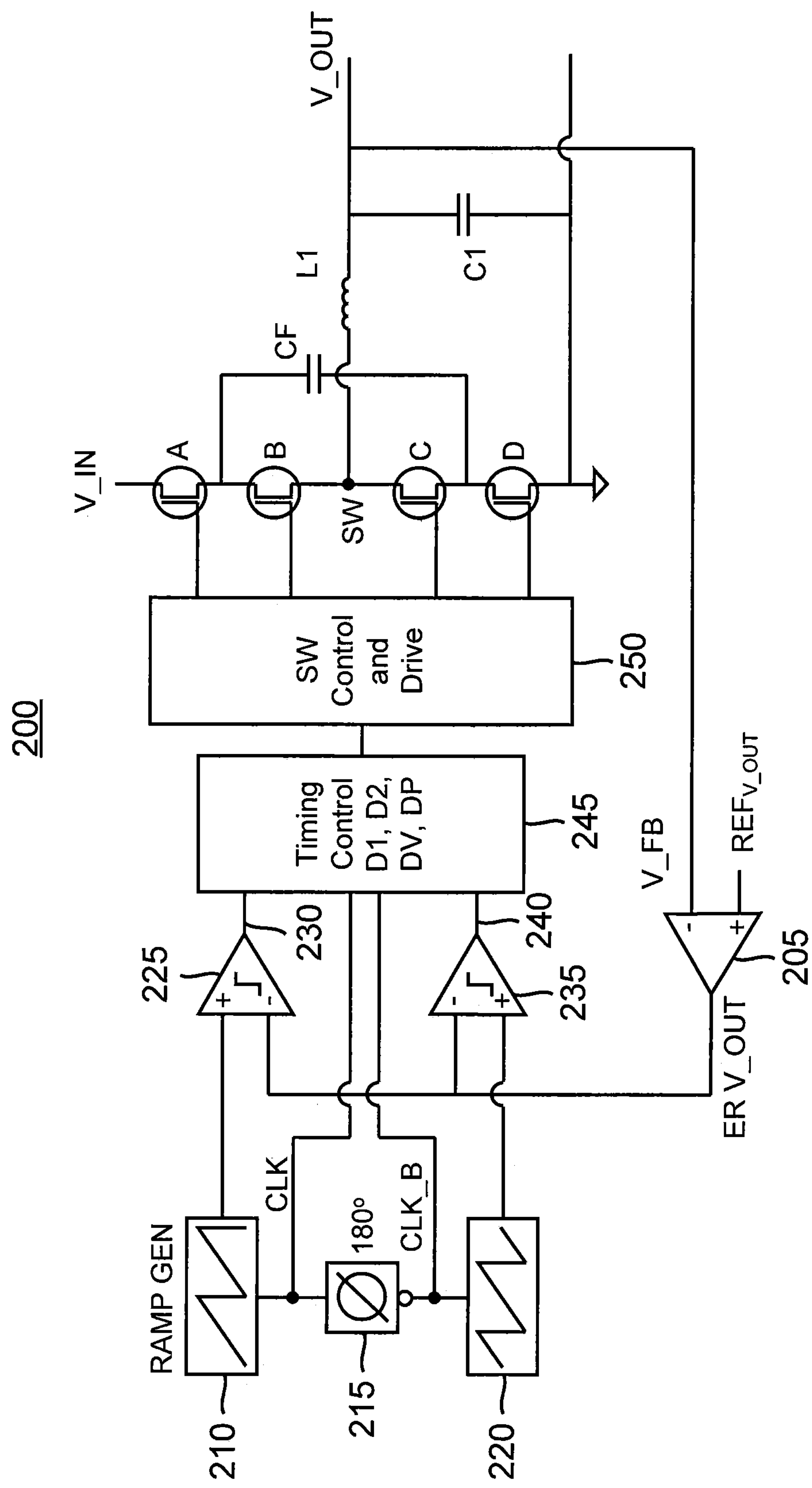
FIG. 2 is a diagram of a multi-level buck converter configured to force minimum pulse width switching states while the multi-level buck converter approaches a 50% duty cycle operation in accordance with an aspect of the disclosure.

An example multi-level buck converter 200 that addresses the voltage regulation issues arising from the minimum DP and DV pulse width limitations is shown in FIG. 2 that includes switch transistors A, B, C, and D arranged in a conventional fashion. In particular, switch transistor A has a first terminal connected to a node for the input voltage V_IN and a second terminal connected to a first terminal for a flying capacitor CF. In addition, the second terminal for switch transistor A connects to a first terminal for switch transistor B. As used herein, a transistor "terminal" refers to, for example, a drain or source terminal for a metal-oxide semiconductor field-effect-transistor (MOSFET). A second terminal for switch transistor B connects to a switch (SW) terminal for an inductor L1 that connects to an output capacitor C1 for smoothing an output voltage V_OUT. Switch transistor C has a first terminal connected to the SW node (the input node for inductor L1) and a second terminal connected to a remaining terminal for the flying capacitor CF. In addition, the second terminal for switch transistor C connects to a first terminal of switch transistor D that in turn has a second terminal connected to ground.

Figure 1:
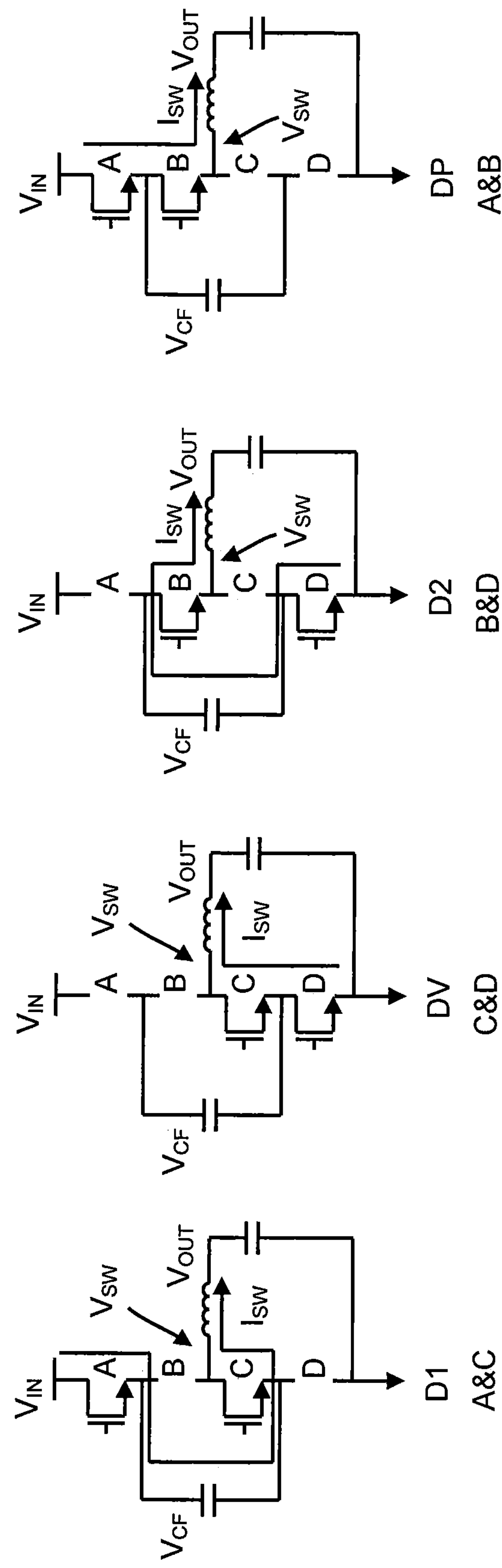
FIG. 1 illustrates the four switching states for a conventional four-switch multi-level buck converter.

An error amplifier 205 generates an error voltage (ER V_OUT) responsive to a difference between the output voltage and a reference voltage ($REF_{V\_OUT}$). The error voltage is compared to a dual-ramp signal formed by two ramp signals that are 180° out of phase with each other (note that other phase relationships may be used in alternative embodiments). A first ramp generator 210 generates a first ramp signal responsive to a clock signal (CLK) from a clock source 215. A second ramp generator 220 generates a second ramp signal responsive to an inverted clock signal (CLK_B) from clock source 215. The second ramp signal is thus 180° out of phase with the first ramp signal. A first comparator 225 compares the first ramp signal to the error signal to generate a first control signal 230. Similarly, a second comparator 235 compares the second ramp signal to the error signal to generate a second control signal 240. A timing control logic circuit 245 determines the timings for the D1, D2, DV, and DP switching states (discussed with regard to FIG. 1) responsive to first control signal 230 and second control signal 240 as further discussed herein. A switching control and drive circuit 250 drives the gates of switch transistors A, B, C, and D to effect the switching state selected by timing control logic circuit 245. For example, if timing control logic circuit 245 indicates that switching state D1 should be asserted, switch control and drive circuit 250 switches on switch transistors A and C by driving their gates with the appropriate voltages. If switch transistors A and C are NMOS transistors, switch control and drive circuit 250 charges their gates to switch these transistors on. At the same time, the gates of switch transistors B and D would be discharged. The charging and discharging of the gates would be reversed in a PMOS switch transistor embodiment.

Figure 3:
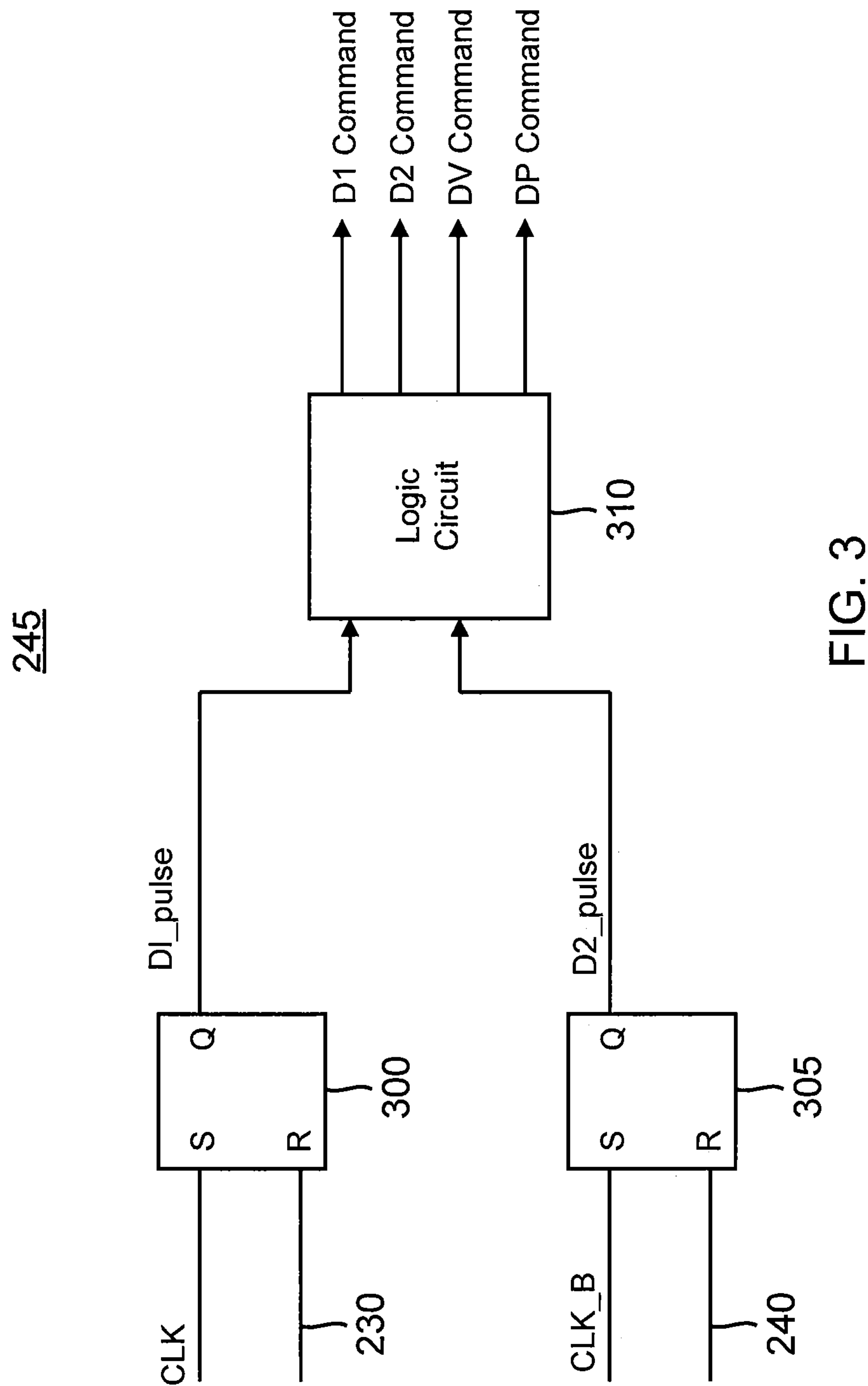
FIG. 3 illustrates additional details for the timing control circuit in the multi-level buck converter of FIG. 2.

An example of timing control logic circuit 245 is shown in more detail in FIG. 3. A first flip-flop 300 sets (asserts) a first signal designated as D1_pulse in response to a rising edge for the clock signal (designated as CLK) from clock source 215 (FIG. 2). Flip-flop 300 resets the D1_pulse signal in response to the assertion of first control signal 230 from first comparator 225 (FIG. 2). The D1_pulse signal will thus be asserted at the start of the ramp period for the first ramp signal and de-asserted when the first ramp signal is greater than the error signal from differential amplifier 205 (FIG. 2). A second flip-flop 305 sets a second signal designated as D2 pulse in response to a rising edge for the inverted clock signal (designated as CLK_B) from clock source 215. Flip-flop 305 resets the D2 pulse signal in response to the assertion of second control signal 240 from second comparator 235 (FIG. 2). The D2_pulse signal will thus be asserted at the start of each period for the second ramp signal and de-asserted when the second ramp signal is greater than the error signal.

As used herein, a signal such as signals D1_pulse and D2_pulse is deemed to be asserted or set when is has a logic true value, regardless of whether the logic convention is logic-high or logic-low. Similarly, a signal is deemed herein to be de-asserted or reset when it has as logic false value. As used herein, a signal that is "on" is deemed to be asserted whereas a signal that is "off" is deemed to be de-asserted. There are thus four possible on and off combinations for the logic states for the D1_pulse and D2_pulse signals. These four logical states may be mapped to the switching states D1, D2, DP, and DV by a logic circuit 310 as follows. Should the D1_pulse signal be on and the D2_pulse signal be off, logic circuit 310 asserts a command to select for the D1 switching state. Conversely, should the D2_pulse signal be on while the D1_pulse signal is off, logic circuit 310 asserts a command to select for the D2 switching state. If both signals are off, logic circuit 310 asserts a command to select for the DV switching state. Finally, if both signals are on, logic circuit 310 asserts a command to select for the DP switching state. The resulting operating rules coded into logic circuit 310 are summarized in the following Table 1:

TABLE 1

| Switching State | D1_pulse | D2_pulse |
|---|---|---|
| D1 | ON | OFF |
| D2 | OFF | ON |
| DV | OFF | OFF |
| DP | ON | ON |

Figure 4:
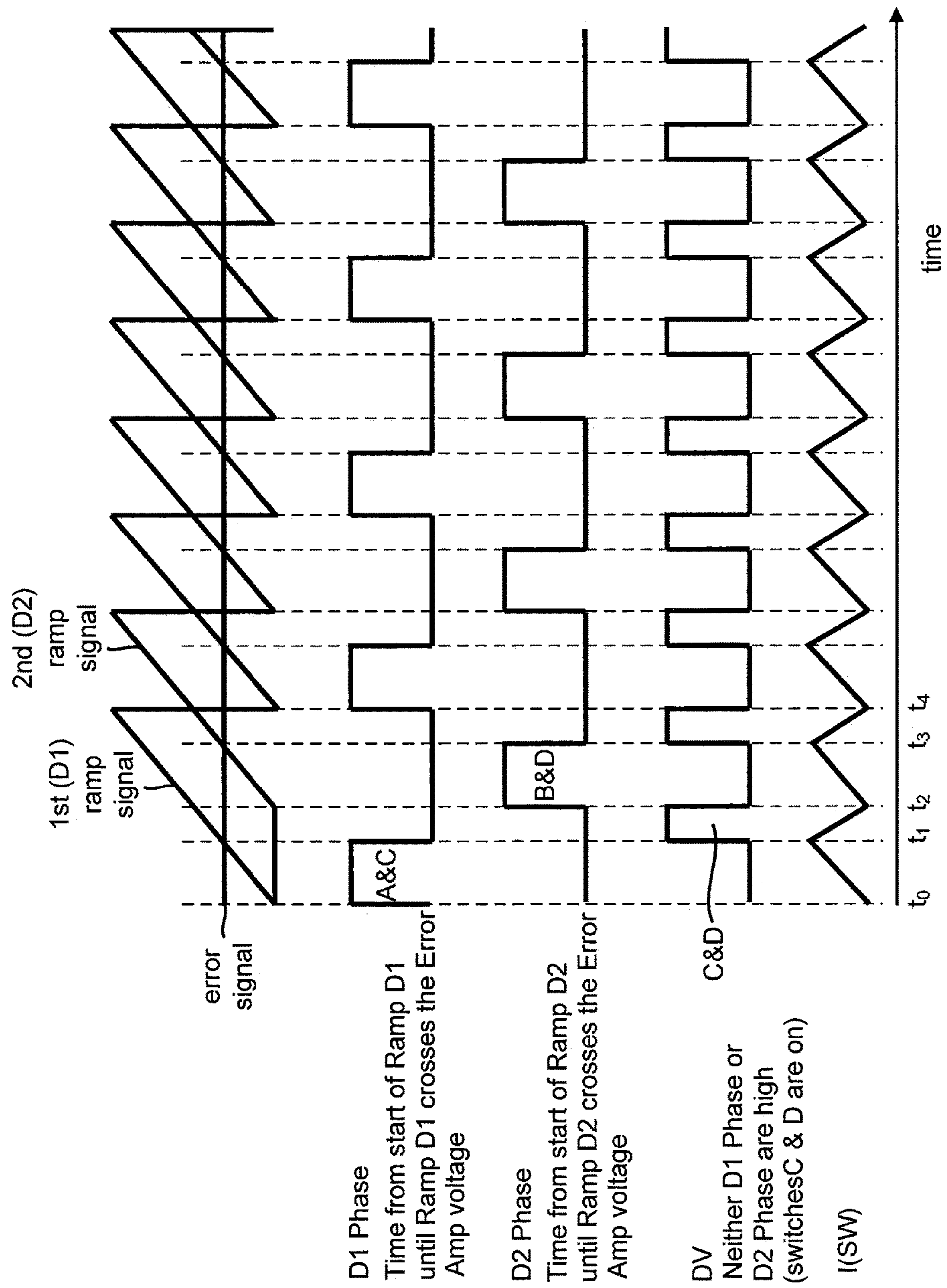
FIG. 4 illustrates the ramp signal waveforms and resulting switching states for a conventional multi-level buck converter operating while the error signal is less than a mid-level for the ramp signals.

The resulting control depends upon the duty cycle, which in turn determines whether the error signal is less than 50% or greater than 50% of the peak voltage for the two ramp signals (one-half of the peak voltage). An example of the ramp waveforms for an error signal that is less than 50% of the ramp signals' peak voltage is shown in FIG. 4. The first ramp signal begins a period at a time t0 at which point the first ramp signal continues to increase until it is greater than the error signal at a time t1. The second ramp signal does not start its period until a time t2. The D1_pulse signal discussed with regard to FIG. 3 is thus on from time t0 to time t1 whereas the D2_pulse signal is off. The D1 switching state is therefore asserted from time t0 to t1. Between times t1 and t2, both signals D1_pulse and D2_pulse will be off such that the DV switching state is asserted from time t1 to time t2. At time t2, the D2_pulse signal is asserted until it is de-asserted when the second ramp signal is greater than the error signal at a time t3. The first ramp signal does not begin another period until a time t4. Thus, the D2_pulse signal will be on and the D1_pulse signal will be off from times t2 to t3 such that the D2 switching state is asserted during this period. It may thus be seen that the switching states will continue to cycle in this pattern of D1 to DV to D2 as long as the error signal is below the mid-point of the two ramp signals. Another such cycle will begin at time t4 with the D1 switching state. The current into the switching node I(SW) increases during the D1 switching state as the input voltage is charging the flying capacitor. During the DV switching state, the current I(SW) declines as the inductor freewheels. During the D2 switching state, the current I(SW) again increases as the flying capacitor discharges into the switching node SW.

Figure 5:
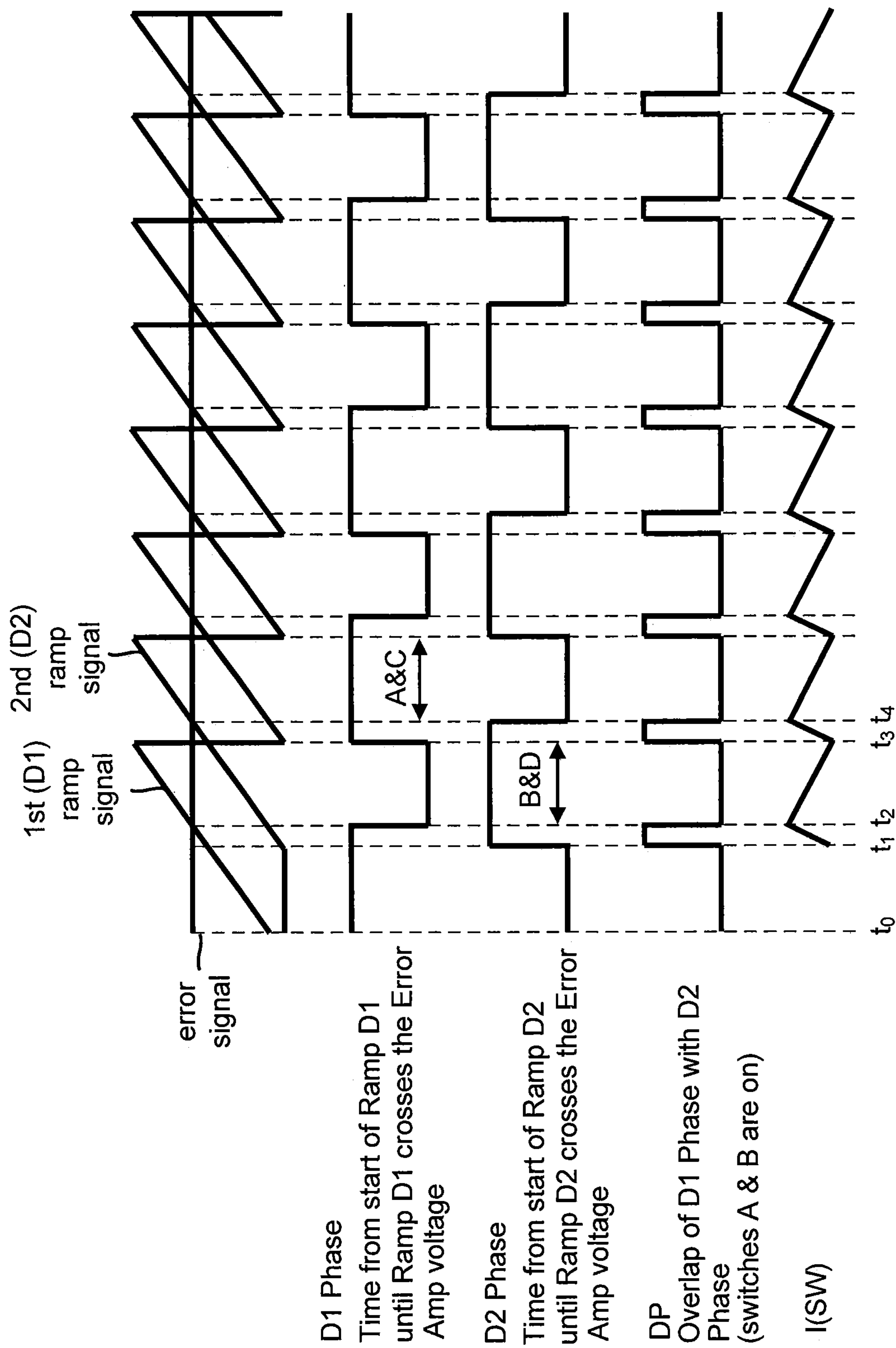
FIG. 5 illustrates the ramp signal waveforms and resulting switching states for a conventional multi-level buck converter operating while the error signal is greater than a mid-level for the ramp signals.

Should the error signal increase beyond the mid-point for the ramp signals, the control disclosed herein produces the waveforms shown in FIG. 5. Because the ramp waveforms are 180° degrees out of phase with each other and the error signal is above their mid-points, a ramp signal starting from the beginning of a ramp period cannot increase above the error signal before the remaining ramp signal starts another period. For example, the first ramp signal begins a period at a time t0. Given the phase relationship to the second ramp signal, the first ramp signal will reach its mid-point at time t1 when the second ramp signal begins its period. But the error signal lies above the mid-point so from time t1 until the first ramp signal passes the error signal at a time t2, both the D1_pulse and the D2_pulse signals will be on. From time t0 to time t1, only the D1_pulse signal is on such that the D1 switching period is asserted between times t0 and time t1. From time t1 to time t2, the DP switching state is asserted. Since the D1_pulse signal is switched off after time t2 until the start of its next period at a time t3, the D2 switching state is asserted from time t2 until time t3. From time t3 to a time t4, both the D1 and D2 phases are on such that the DP switching state is selected. The cycle of D1 to DP to D2 to DP would then repeat such that the D1 switching state is asserted at time t4. Given the increase in the error signal, both the D1 and D2 switching states are de-magnetizing such that switching current I(SW) declines during these switching states. In contrast, the DP switching state is a magnetizing state such that the switching current I(SW) increases during the DP switching state.

Should the error signal transition across the mid-point, it can be seen that the D1 and D2 switching states will have essentially a 50% duty cycle. However, gate drive non-overlap requirements prevent a D1 switching state from transitioning directly to a D2 switching state. In addition, the error signal is not a DC voltage and thus possesses some voltage ripple such that the error signal will not be maintained at the midpoint of the dual-ramp signal. Moreover, input voltage fluctuations and system noise also prevent the D1 and D2 switching states from reaching a 50% duty cycle. It is thus conventional that the D1 and D2 switching states are separated by at least a relatively small pulse width for either the DP or the DV switching states. Despite these non-idealities, the duty cycle for the D1 and D2 switching states will approach 50% as the error signal approaches the mid-point of the dual-ramp signal. If the error signal is slightly below the mid-point of the dual-ramp signal, the minimum pulse width for the DV switching state will occur between the D1 and D2 switching states whereas the minimum pulse width of the DP switching state will occur between the D1 and D2 switching states as the error signal increases slightly over the mid-point. But these small pulse widths for the DV and DP switching states cannot be less than the minimum pulse width as discussed earlier. For example, a minimum pulse width of, for example, 50 ns guarantees a proper and robust gate drive operation of the A, B, C, and D transistors to effectuate the DV and DP switching states for multi-level control architectures that do not allow the inductor current to become negative.

Figure 6:
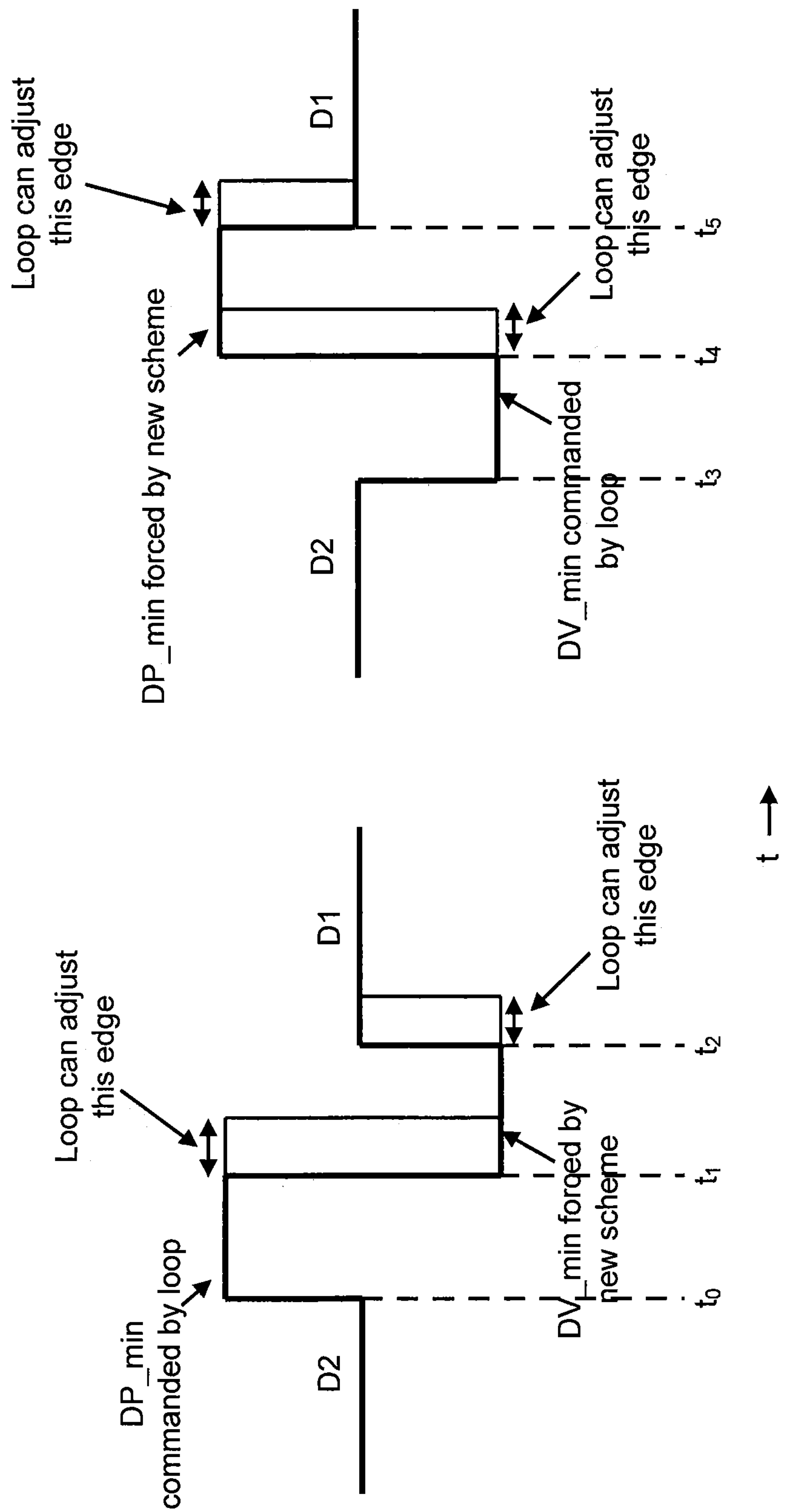
FIG. 6 illustrates the switching waveforms for the forcing of minimum pulse width DP and DV switching states by the multi-level buck converter of FIG. 2.

But the desired pulse width of the DV or DP switching states in the vicinity of 50% duty cycle operation as set forth in Table 1 above may be less than the minimum pulse width. For example, suppose that a rigorous application of Table 1 results in a desired DV switching state that is less than the minimum pulse width. Operation with the minimum pulse width for the DV switching state then results in over magnetization of inductor L1. Conversely, operation with the minimum pulse width for the DP switching state when proper operation would require less than the minimum pulse width results in an under magnetization of the inductor L1. To address these issues, timing control logic circuit 245 is configured to force a minimum pulse width DV switching state following a DP switching state that is also of the minimum pulse width. Similarly, timing control logic circuit 245 is also configured to force a minimum pulse width DP switching state following a DV switching state that is of the minimum pulse width. In this fashion, the forced DP and DV switching states prevent inductor L1 from being over or under magnetized. An example waveform for the switching states is shown in FIG. 6. The error signal (not illustrated) is substantially equal to the midpoint of the dual-ramp signal such that D1 and D2 switching states have a duty cycle of nearly 50%. But as discussed above, non-idealities prevent the control loop from achieving a 50% duty cycle for the D1 and D2 switching states such that these switching states will be separated by a either a minimum pulse width DV or DP switching state depending upon whether the error signal is slightly above or slightly below the dual-ramp signal's midpoint. For example, at a time t0, timing control logic circuit 245 commands for a minimum pulse width DP switching state (DP_min) after the termination of a D2 switching state. Should control proceed as set forth in Table 1 above, the control loop would call for a D1 switching state at a time t1 at the expiration of the minimum pulse width DP switching state. But timing control logic circuit 245 instead forces a minimum pulse width DV switching state (DV_min) to occur at time t1 to offset the minimum pulse width DP switching state that occurred from time t0 to time t1. At a time t2, the minimum pulse width DV switching state expires so the control loop asserts the D1 switching state. Should the error signal instead be such that the control loop calls for a DV_min switching state after the expiration of the D2 switching state as shown for a time t3, then a DP_min switching state is forced at a time t4 following the expiration of the DV_min switching state. The D1 switching state would then be asserted at a time t5 following the expiration of the forced DP_min switching state. In subsequent switching cycles, the error signal may further decrease below the midpoint of the dual-ramp signal. The control loop would then increase the DV pulse width accordingly so as to be greater than the minimum pulse width such that there would be no forcing of a DP_min switching state.

Figure 7A:
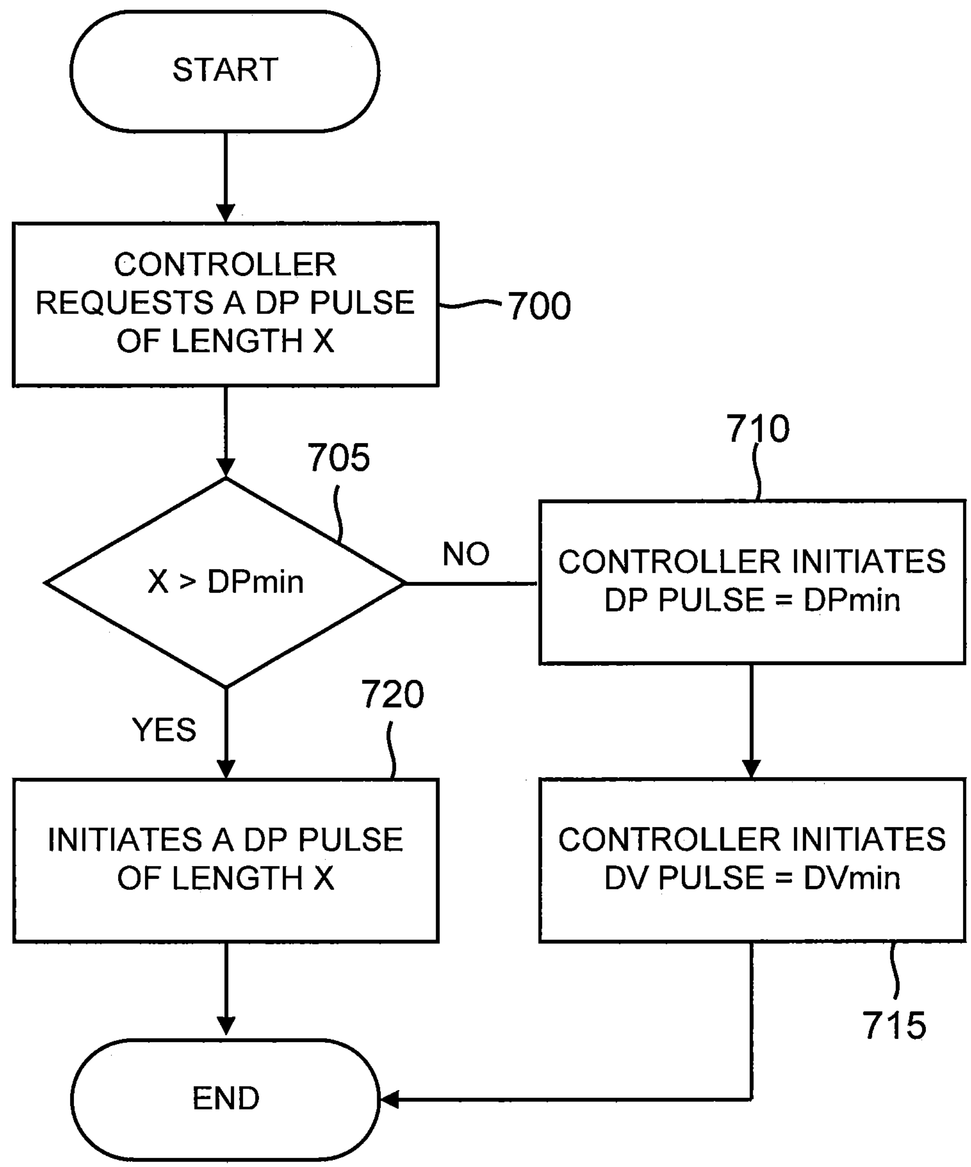
FIG. 7A is a flowchart for a method of forcing of a minimum pulse width DV switching state following a minimum pulse width DP switching state in accordance with an aspect of the disclosure.

The resulting forcing of a DV_min switching state following a DP_min switching state by timing control logic circuit 245 is also illustrated in the flowchart of FIG. 7A. In a step 700, the controller (timing control logic circuit 245) requests for a DP switching state having a pulse length of X seconds. In step 705, the controller determines whether the pulse length of X is greater than the minimum pulse width (DPmin). If the pulse length is not greater than the minimum pulse width, the controller initiates a minimum pulse width DP switching state in a step 710. Following step 710, the controller then forces a minimum pulse width DV switching state in a step 715. Should the determination in step 705 be positive, the controller proceeds to initiate the DP pulse of length X in a step 720 without initiating any countervailing DV switching state. It will be appreciated that the controller may increase the minimum pulse width for the switching states asserted in steps 710 and 715. In subsequent switching cycles, the error signal may continue to increase relative the midpoint of the dual-ramp signal. The control loop would then increase the DP pulse width accordingly so as to be greater than the minimum pulse width such that there would be no forcing of a DV_min switching state.

Figure 7B:
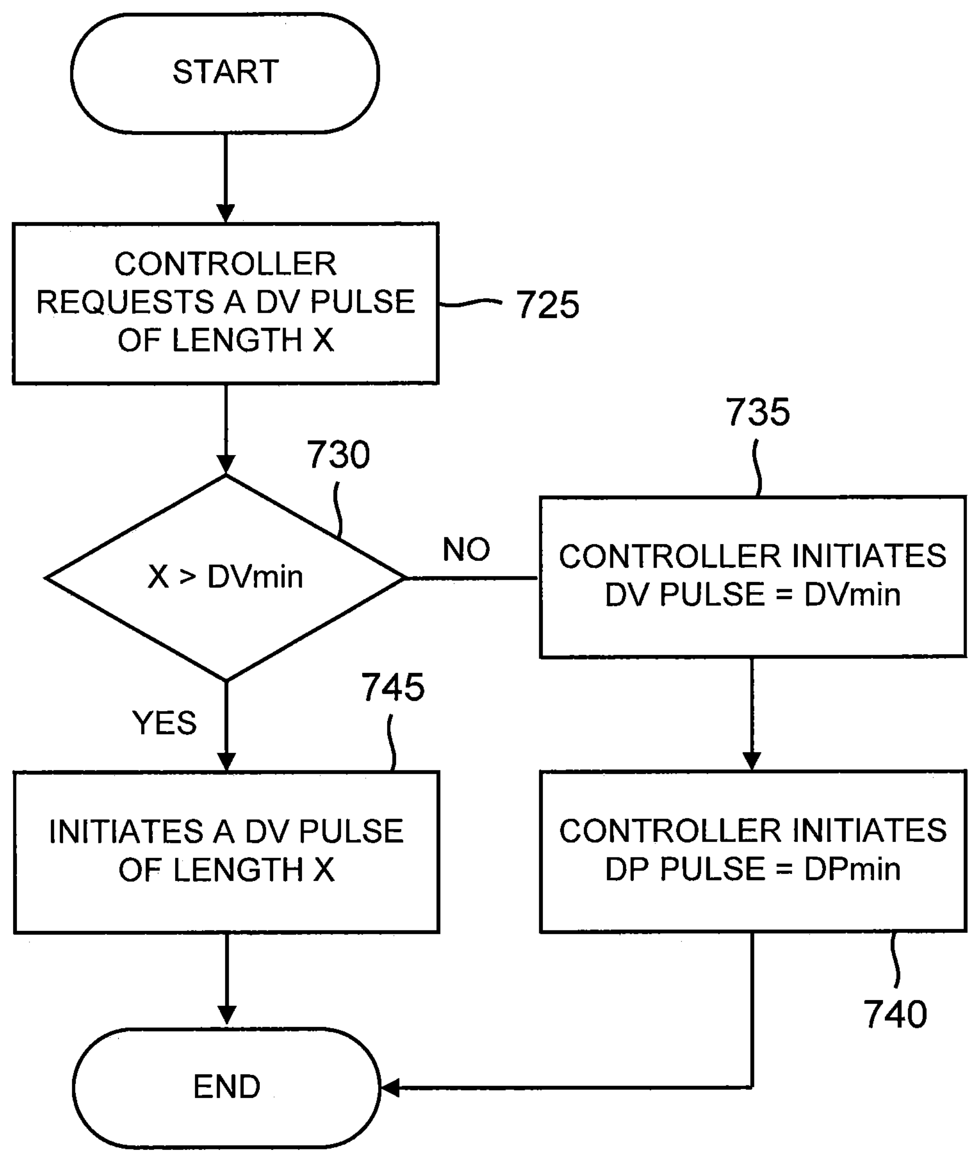
FIG. 7B is a flowchart for a method of forcing of a minimum pulse width DP switching state following a minimum pulse width DV switching state in accordance with an aspect of the disclosure.

The forcing of a DV_Min switching state (which may also be designated as a DVmin switching state) by timing control logic circuit 245 is illustrated in the flowchart of FIG. 7B. In a step 725, the controller requests for a DV switching state having a pulse length of X seconds. In a step 730, the controller determines whether the pulse length of X is greater than the minimum pulse width (DVmin). If the pulse length is not greater than the minimum pulse width, the controller initiates a minimum pulse width DV switching state in a step 735. Following step 735, the controller then forces a minimum pulse width DP switching state in a step 740. Should the determination in step 730 be positive, the controller proceeds in a step 745 to initiate the DV pulse of length X without initiating any countervailing DP switching state. In addition, the controller may also decrease the switching frequency in step 735 since the minimum-sized DV and DP switching states may lower the switching efficiency.

Note that the controller may be configured to not test whether the pulse width for a DV or DP switching state is greater than the minimum pulse width in alternative embodiments. Instead, the controller may be configured to determine when the D1 and D2 switching states were sufficiently close to a 50% duty cycle, whereupon the controller would force a minimum pulse width DP state between each pair of alternating D1 and D2 switching states. Such forcing thus compensates for any minimum DV switching states initiated by the controller. Alternatively, the controller may instead be configured to force a minimum pulse width DV switching state between each pair of alternating D1 and D2 switching states when the D1 and D2 switching states are sufficiently close to a 50% duty cycle. Such forcing thus compensates for any minimum pulse width DP switching states initiated by the controller. But note that such forcing of either a DP or DV minimum pulse width switching state simply in response to the D1 and D2 switching state duty cycle may force unnecessary DV and DP states, which lowers switching efficiency.

Current Limit Control

Figure 8:
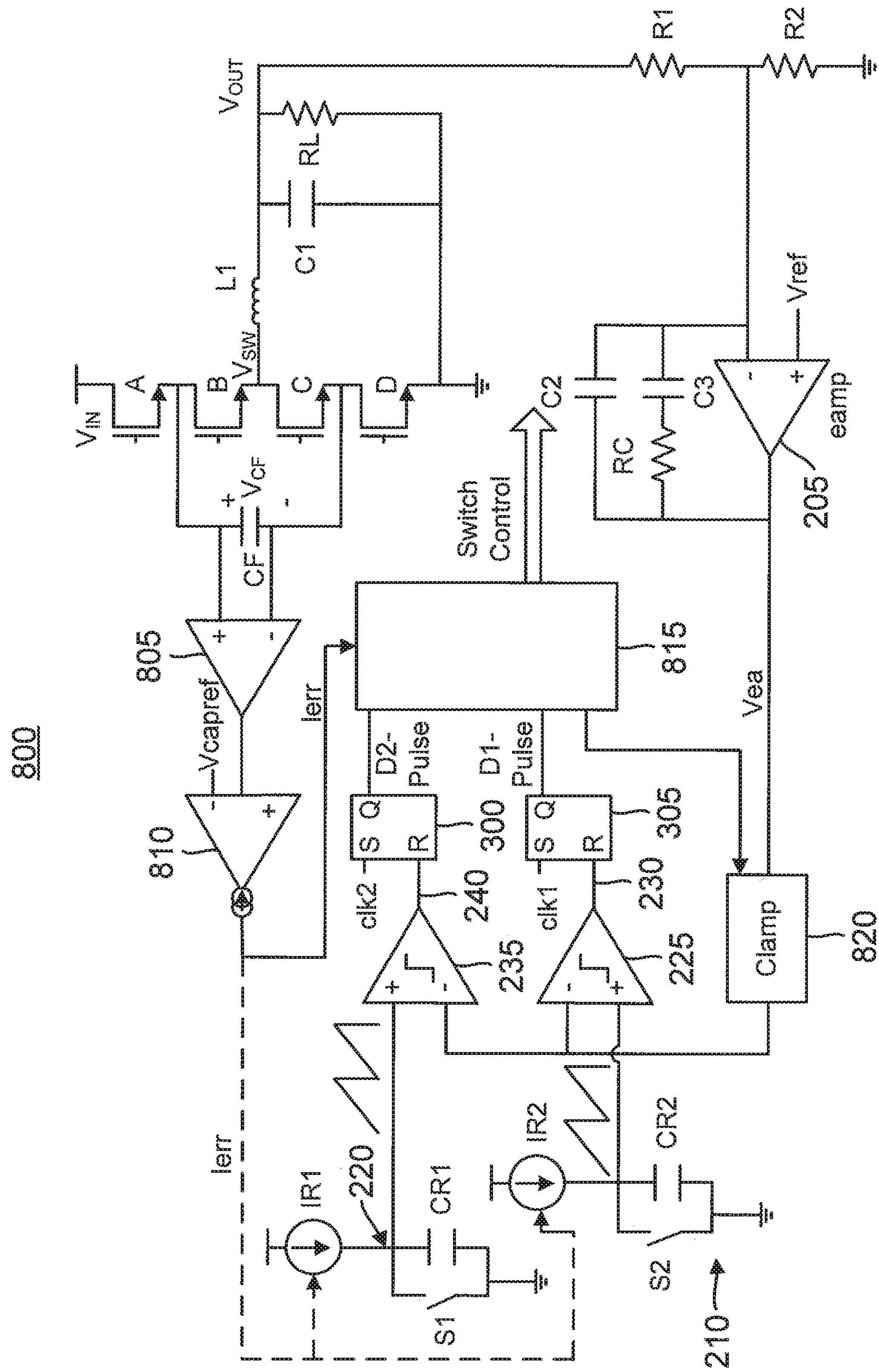
FIG. 8 is a diagram of a multi-level buck converter configured to maintain the flying capacitor voltage in regulation despite the occurrence of an over-current condition for the inductor in accordance with an aspect of the disclosure.

A multi-level buck converter 800 with dual-ramp control and flying capacitor voltage regulation in the presence of current limit control is illustrated in FIG. 8. Switch transistors A, B, C, and D, flying capacitor CF, the inductor L1, and the output capacitor C1 are arranged as discussed with regard to multi-level buck converter 200. In addition, the load is represented by a resistance RL. The output voltage $\backslash T_{OUT}$ is sampled by a voltage divider formed by resistors R1 and R2 so that the sampled output voltage may be compared to the reference voltage Vref in error amplifier 205. The error signal voltage (Vea) from error amplifier 205 is compensated through a loop filter formed by capacitors C2, C3, and resistor RC. It will be appreciated that an analogous loop filter may be used to compensate the error signal in multi-level buck converter 200 of FIG. 2. The error signal voltage is compared at comparators 225 and 235 to form control signals 230 and 240, respectively, as also discussed with regard to FIG. 2. First ramp signal generator 210 includes a current source IR2 that drives a capacitor CR2. The first ramp signal will thus increase in voltage as the current source IR2 charges capacitor CR2. Each ramp signal period for the first ramp signal begins through a switch S2 resetting the voltage on capacitor CR2. Similarly, second ramp signal generator 220 includes a current source IR1 that drives a capacitor CR1 that is reset by a switch 51.

An amplifier 805 monitors the flying capacitor voltage $V_{CF}$ so that it may be compared to a flying capacitor reference voltage (Vcapref) at a transconductance amplifier 810. The output of transconductance amplifier 810 is thus an error current Ierr that represents the error (difference) between the flying capacitor voltage and the flying capacitor reference voltage. It will be appreciated that such an error signal may be a voltage error signal in alternative embodiments. Referring again to FIGS. 4 and 5, note that switching states D1 and D2 are either both magnetizing or both de-magnetizing, depending upon the error signal amplitude. If the sum of both D1 and D2 is maintained constant, the desired output power regulation will thus be achieved. It can be seen from FIG. 1 that the switching state D1 increases the flying capacitor voltage whereas switching state D2 decreases it. Should the flying capacitor voltage be too high, the flying capacitor regulation disclosed herein thus increases the length of switching state D2. But switching state D1 must then be decreased so that the sum of D1 and D2 is maintained constant. To regulate the flying capacitor voltage, the multi-level buck converter 600 thus includes a switch control circuit 815 that modifies the periods for the D1 and D2 switching states relative to what would be commanded by Table 1 responsive to the error current Ierr while leaving the sum of D1 and D2 switching state periods unchanged. To effect this regulation, opposing edges of the D1_pulse and D2_pulse signals may be either delayed or advanced depending upon the sign of the error current Ierr as is discussed in the ’635 patent. The complement clock signal to set flip-flop 305 in FIG. 8 is denoted as “clk1” whereas the clock signal to set flip-flop 300 is denoted as “clk2.”

Rather than adjust the D1_pulse and D2_pulse signals in switch control circuit 815, the ramp signal generation itself may be adjusted as also shown in FIG. 8. For example, the two current sources IR1 and IR2 in ramp signal generators 210 and 215 may be configured to respond in a complementary fashion to the error current Ierr. The ramp slope for the two ramp signals is thus adjusted such that rate of increase for one ramp signal is increased while the remaining ramp signal rate of increase is decreased.

Figure 9:
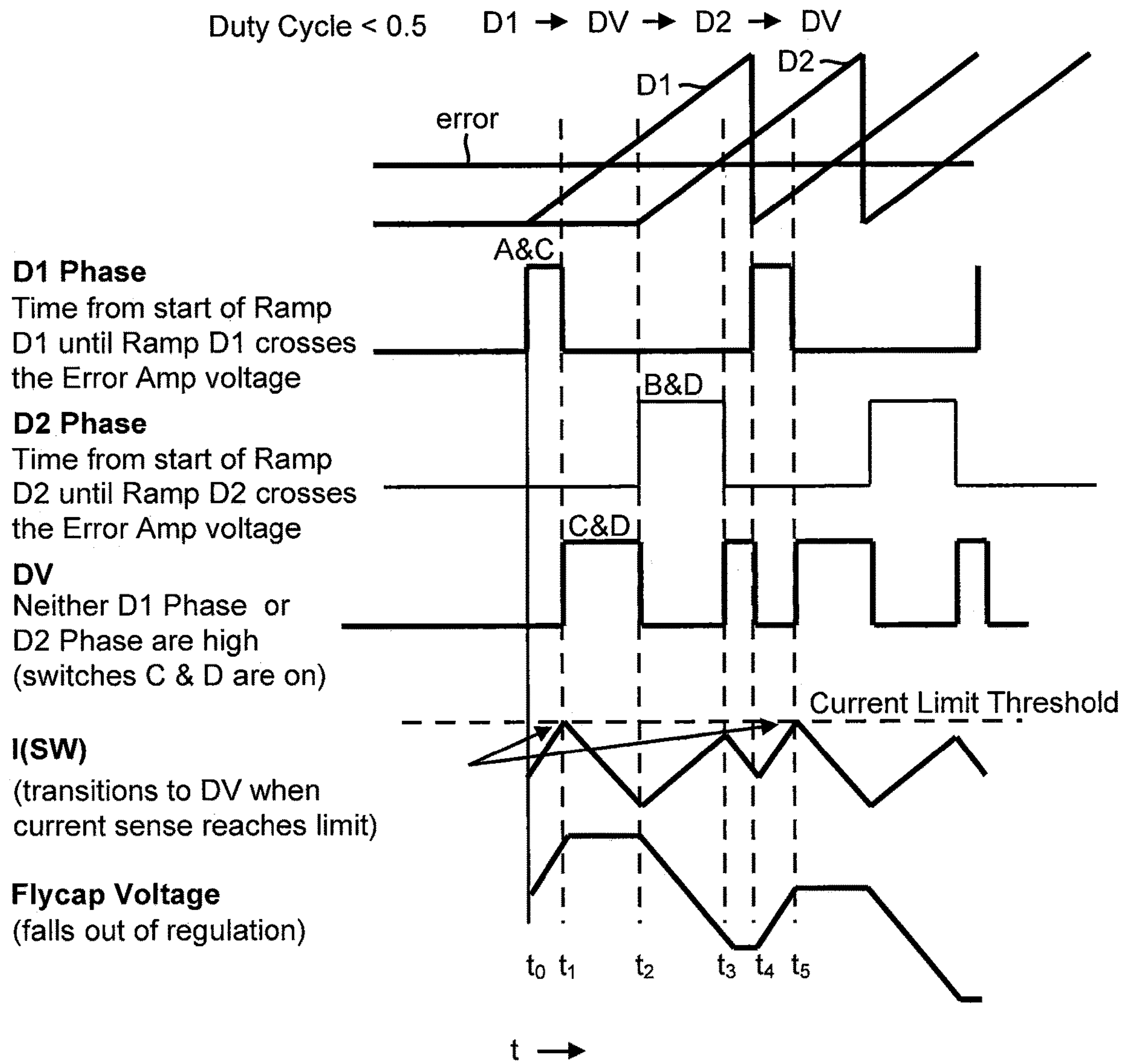
FIG. 9 illustrates the ramp signal waveforms and resulting switching states for a conventional multi-level buck converter operating during the occurrence of an over-current condition for the inductor in accordance with an aspect of the disclosure.

As noted earlier, there is a limit to the amount of current that flows into the switching node for the inductor L1. It is thus conventional for a multi-level buck converter such as buck converter 800 to sense whether a current I(SW) flowing through inductor L1 is over a current limit. The current sensing circuitry to perform such a conventional over current detection is not shown in FIG. 8 for illustration clarity. This current limit will be reached during a magnetizing switching state. As shown in FIG. 4, it is the D1 switching state that is the magnetizing state during which the inductor current I(SW) is increasing while the duty cycle is less than 50%. But as shown in FIG. 5, it is the DP switching state this is the magnetizing state while the duty cycle is greater than 50%. But once the current limit is reached such as a magnetizing switching state, the switching state must be terminated to prevent damage from the over-current condition. An example of this termination is shown in FIG. 9. In this example, the duty cycle for the multi-level buck converter is less than 50% such that the multi-ramp control repeats through a sequence of a D1, a DV, a D2, and a DV switching state. For example, the D1 switching state starts at a time t0. Under the control set forth in Table 1, the D1 switching state would stay asserted until the D1 ramp signal rises above the error signal (ignoring any modification of the D1 switching state pulse width to regulate the flying capacitor voltage). But at a time t1, the current into the switching node (the input terminal) for inductor L1 rises above the current limit. The D1 switching state is thus terminated whereas the DV switching state is initiated at time t1. Once the D2 ramp signal begins a new ramp cycle at a time t2, the DV switching state is terminated whereas the D2 switching state is initiated. At a time t3, the D2 ramp signal rises above the error signal but the D1 ramp signal is also above the error signal. Thus, the controller initiates the DV switching state at time t3 until the D1 ramp signal resets at a time t4, whereupon the D1 switching state is again initiated. But the current limit is again reached at a time t5 so that the DV switching state is initiated. The repeated early termination of the D1 switching state at times t1 and t5 causes the flying capacitor (flycap) to fall out of regulation. It will be appreciated that it would be the DP switching state that would be terminated in response to the over-current condition if the duty cycle were greater than 50%.

Figure 10:
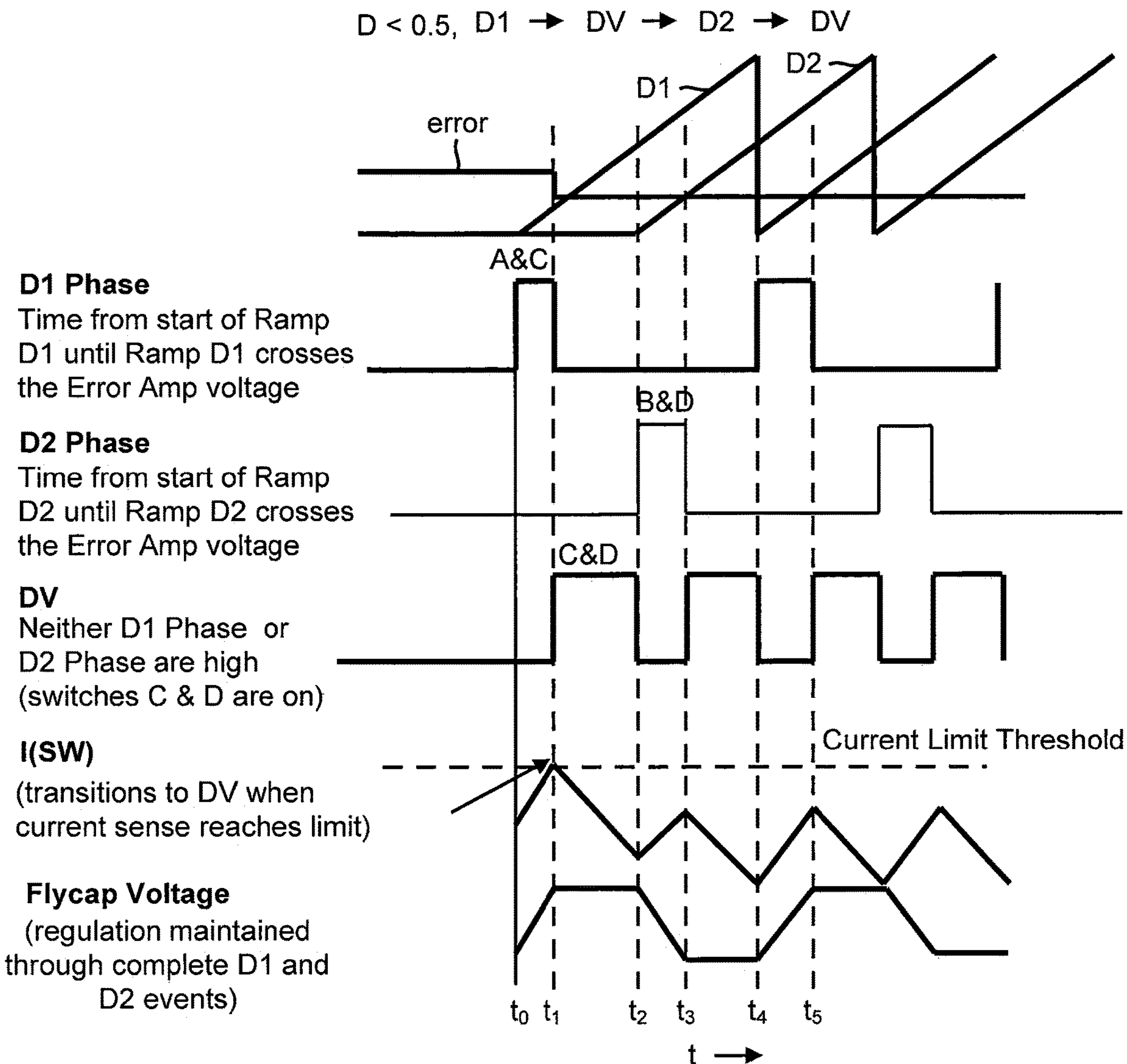
FIG. 10 illustrates the ramp signal waveforms and resulting switching states for the multi-level buck converter of FIG. 8 operating during the occurrence of an over-current condition for the inductor in accordance with an aspect of the disclosure.

Referring again to FIG. 8, multi-level buck converter 800 includes a selective clamp circuit 820 that selectively clamps the error signal voltage from error amplifier 205 responsive to the current limit cutting short the D1 switching state. For example, switch control circuit 815 may be configured to respond to the over-current condition when the duty cycle is less than 50% by triggering clamp circuit 820 to clamp and thus lower the error signal voltage. The resulting switching states are illustrated in FIG. 10 for operation with the duty cycle being less than 50% (D<0.5). At a time t0, the D1 ramp signal begins to ramp from zero. The D1 switching state also is initiated at time t0 until an over-current condition is reached at time t1 due to the current (I(SW)) into the switching node of the inductor L1 exceeding the current limit. At time t1, the error signal is clamped to a lower level due to the D1 switching state being cut short due to the over-current condition. The DV switching state is then initiated from time t1 to a time t2 when the D2 ramp signal begins a new ramp cycle. The D2 switching cycle is thus initiated from time t2 to a time t3 when the D2 ramp signal rises above the clamped error signal. Since the D1 ramp signal has not yet reset, the DV switching state is then initiated from time T3 to a time T4 when the D1 ramp signal resets. In response to the D1 signal reset, the controller then triggers the D1 switching state from time t4 to a time t5 when the D1 ramp signal rises above the clamped error signal. The D1 switching state is thus "normalized" in that it ends responsive to the clamped error signal instead of the current limit being reached for current I(sw). The flying capacitor voltage is thus maintained within regulation.

Figure 11:
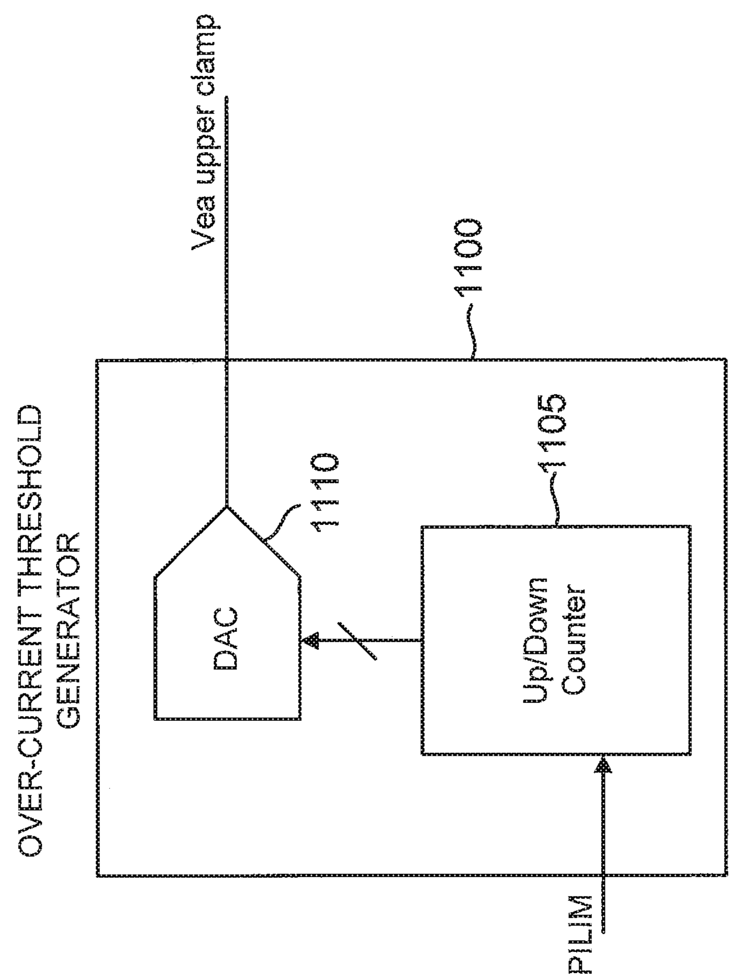
FIG. 11 is a diagram of an over-current threshold generator for the clamp circuit in the multi-level buck converter of FIG. 10.

To control the clamping of the error voltage, clamp circuit 820 may include an over-current threshold generator circuit 1100 as shown in FIG. 11. In response to the detection that the I(SW) current into inductor L1 is excessive, an over-current detection circuit (not illustrated) asserts an over-current alarm signal (PILIM) to an up/down counter 1105. Counter 1105 may be programmed to assert a constant count to a digital-to-analog converter (DAC) 1110 in response to the assertion of the over-current alarm signal. DAC 1110 generates an upper clamp voltage (Vea upper clamp) in response to the count from counter 1105. Clamp circuit 820 clamps the error voltage according to the upper clamp voltage generated by DAC 1110. In an embodiment in which the count is not increased, the clamping is constant while the over-current condition persists. But in alternative embodiments, counter 1105 may increase the count such that the upper clamp voltage is adaptively reduced or increased depending upon whether the over-current limit persists. For example, counter 1105 may update its count at a periodic rate (e.g., every 25 μs). If the over-condition condition ceases, DAC 1105 would thus gradually increase the upper clamp voltage.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for a multi-level buck converter, comprising:

responsive to a first comparison of an error signal to a dual-ramp signal, selecting for a first switching state by switching on a first plurality of switches arranged in series between an input voltage node and an inductor switching node and by switching off a second plurality of switches arranged in series between the inductor switching node and ground;

determining whether a duration for the first switching state equals a minimum pulse width responsive to an output voltage for the multi-level buck converter being substantially 50% of an input voltage for the multi-level buck converter;

selecting for a second switching state following a termination of the first switching state by switching off the first plurality of switches and by switching on the second plurality of switches responsive to a determination that the duration for the first switching state equals the minimum pulse width; and terminating the second switching state so that a duration of the second switching state equals the minimum pulse width.

2. The method of claim 1, further comprising:

responsive to a second comparison of the error signal to the dual-ramp signal, selecting for a repeat of the second switching state by again switching off the first plurality of switches and by switching on the second plurality of switches;

determining whether a duration for the repeat of the second switching state equals the minimum pulse width;

selecting for a repeat of the first switching state following a termination of the repeat of the second switching state by again switching on the first plurality of switches and by switching off the second plurality of switches responsive to a determination that the duration for the repeat of the first switching state equals the minimum pulse width; and terminating the repeat of the first switching state so that the repeat of the first switching state has a duration equaling the minimum pulse width.

3. The method of claim 1, further comprising:

prior to the first switching state, selecting for a third switching state in which a flying capacitor is charged; and following the second switching state, selecting for a fourth switching state in which the flying capacitor is discharged.

4. The method of claim 3, wherein the flying capacitor floats during the first switching state and during the second switching state.

5. The method of claim 1, further comprising:

adjusting the minimum pulse width.

6. A multi-level buck converter, comprising:

a first plurality of switches arranged in series between a voltage input node and an inductor switching node;

a second plurality of switches arranged in series between the inductor switching node and ground;

a dual-ramp generator configured to generate a dual-ramp signal;

an error amplifier configured to drive an error signal responsive to a difference between an output voltage for the multi-level buck converter and a reference voltage; and a controller configured to:

select for a first switching state in which both the first plurality of switches are all on and in which the second plurality of switches are all off for a minimum pulse width responsive to a first comparison of the error signal to the dual-ramp signal and responsive to the output voltage for the multi-level buck converter being substantially 50% of an input voltage for the multi-level buck converter; and select for a second switching state following the first switching state, wherein both the first plurality of switches are all off and the second plurality of switches are all on for the minimum pulse width following a termination of the first switching state.

7. The multi-level buck converter of claim 6, wherein the controller is further configured to:

select for a repeat of the second switching state for a duration equaling the minimum pulse width responsive to a second comparison of the error signal to the dual-ramp signal; and select for a repeat of the first switching state for a first duration following a termination of the repeat of the first switching state.

8. The multi-level buck converter of claim 7, wherein the first duration equals the minimum pulse width.

9. The multi-level buck converter of claim 6, wherein the first plurality of switches is a first pair of switches, and wherein the second plurality of switches is a second pair of switches.

10. A method for a multi-level buck converter, comprising:

generating a first error signal responsive to a difference between an output voltage for the multi-level buck converter and a first reference voltage;

selecting from a plurality of four switching configurations for a plurality of switches for the multi-level buck converter responsive to a comparison of the first error signal to a dual-ramp signal;

determining whether an over-current condition occurred during a magnetizing one of the plurality of four switching configurations;

clamping the first error signal to a reduced level responsive to the determination of the over-current condition during the magnetizing one of the plurality of four switching configurations;

generating a second error signal responsive to a difference between a flying capacitor voltage for the multi-level buck converter and a second reference voltage;

asserting a first control signal at a beginning of each period for a first ramp signal and resetting the first control signal responsive to the first ramp signal exceeding the first error signal, the first control signal having an on time when asserted;

asserting a second control signal at a beginning of each period for a second ramp signal and resetting the second control signal responsive to the second ramp signal exceeding the first error signal, the second control signal having an on time when asserted and wherein a total on time equals a sum of the on time for the first control signal and the on time for the second control signal;

responsive to the second error signal, adjusting the on time for the first control signal to produce an adjusted first control signal that is periodically asserted for a first on time and then reset and adjusting the on time for the second control signal to produce an adjusted second control signal that is periodically asserted for a second on time and then reset such that a sum of the first on time and of the second on time equals the total on time; and selecting from the plurality of four switching configurations for the plurality of switches for the multi-level buck converter responsive to whether the adjusted first control signal and the adjusted second control signal are asserted or reset to regulate the output voltage and the flying capacitor voltage.

11. The method of claim 10, wherein clamping the first error signal comprising clamping the first error signal responsive to an output voltage from a digital-to-analog converter.

12. The method of claim 10, wherein the regulation of flying capacitor voltage maintains an average value for the flying capacitor voltage to equal one-half of an input voltage for the multi-level buck converter.

13. The method of claim 10, wherein clamping the first error signal comprises clamping an error signal voltage.

14. A multi-level buck converter, comprising:

a plurality of switches having four switching states with respect to an inductor and a flying capacitor; and a first error amplifier configured to produce a first error signal responsive to a difference between an output voltage and a first reference voltage;

a controller configured to select from the four switching states responsive to a comparison of the first error signal to a dual-ramp signal;

a clamp circuit configured to clamp the first error signal to a reduced level responsive to an occurrence of a first over-current condition during a magnetizing one of the four switching states;

a flying capacitor; and a second error amplifier configured to produce a second error signal responsive to a difference between a voltage across the flying capacitor and a second reference voltage;

wherein the controller is further configured to generate a first control signal that is asserted at the beginning of each period for a first ramp signal for the dual-ramp signal and reset when the first ramp signal exceeds the first error signal and configured to generate a second control signal that is asserted at the beginning of each period for a second ramp signal for the dual-ramp signal and is reset when the second ramp signal exceeds the first error signal, wherein the controller is further configured to adjust the assertion of the first control signal and the second control signal responsive to the second error signal to produce an adjusted first control signal and an adjusted second control signal, and wherein the controller includes a logic circuit configured to select for respective ones of the four switching states responsive to a binary value for the adjusted first control signal and for the adjusted second control signal to maintain a regulation of the output voltage and of a voltage across the flying capacitor.

15. The multi-level buck converter of claim 14, wherein the clamp circuit is further configured to release the clamp of the first error signal responsive to a period of time elapsing since the occurrence of the first over-current condition without any additional over-current occurrences.

16. The multi-level buck converter of claim 14, wherein the clamp circuit includes a digital-to-analog converter for generating an output signal for clamping the first error signal.

17. The multi-level buck converter of claim 14, wherein the second ramp signal is delayed by 180 degrees in phase with respect to the first ramp signal.

* * * * *